Figure 1:
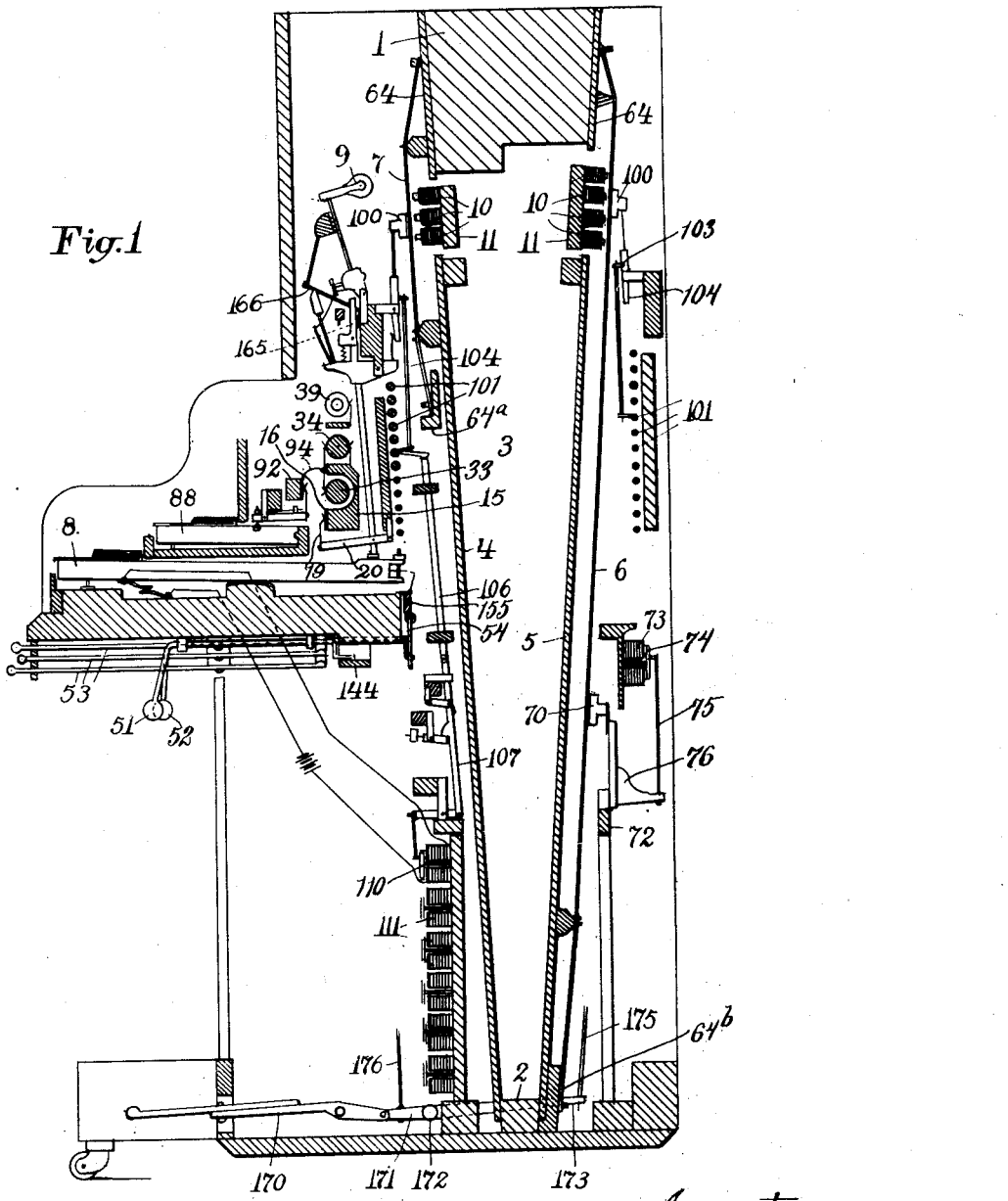

M. L. SEVERY & G. B. SINCLAIR.
ELECTRICAL MUSICAL INSTRUMENT.
APPLICATION FILED JAN. 31, 1913.

1,196,401.

Patented Aug. 29, 1916.
7 SHEETS—SHEET 1.

Witnesses;
Edwin Shivell
E. E. Waili

Inventors
Melvin L. Severy,
George B. Sinclair,
By A. B. Upham
Attorney.

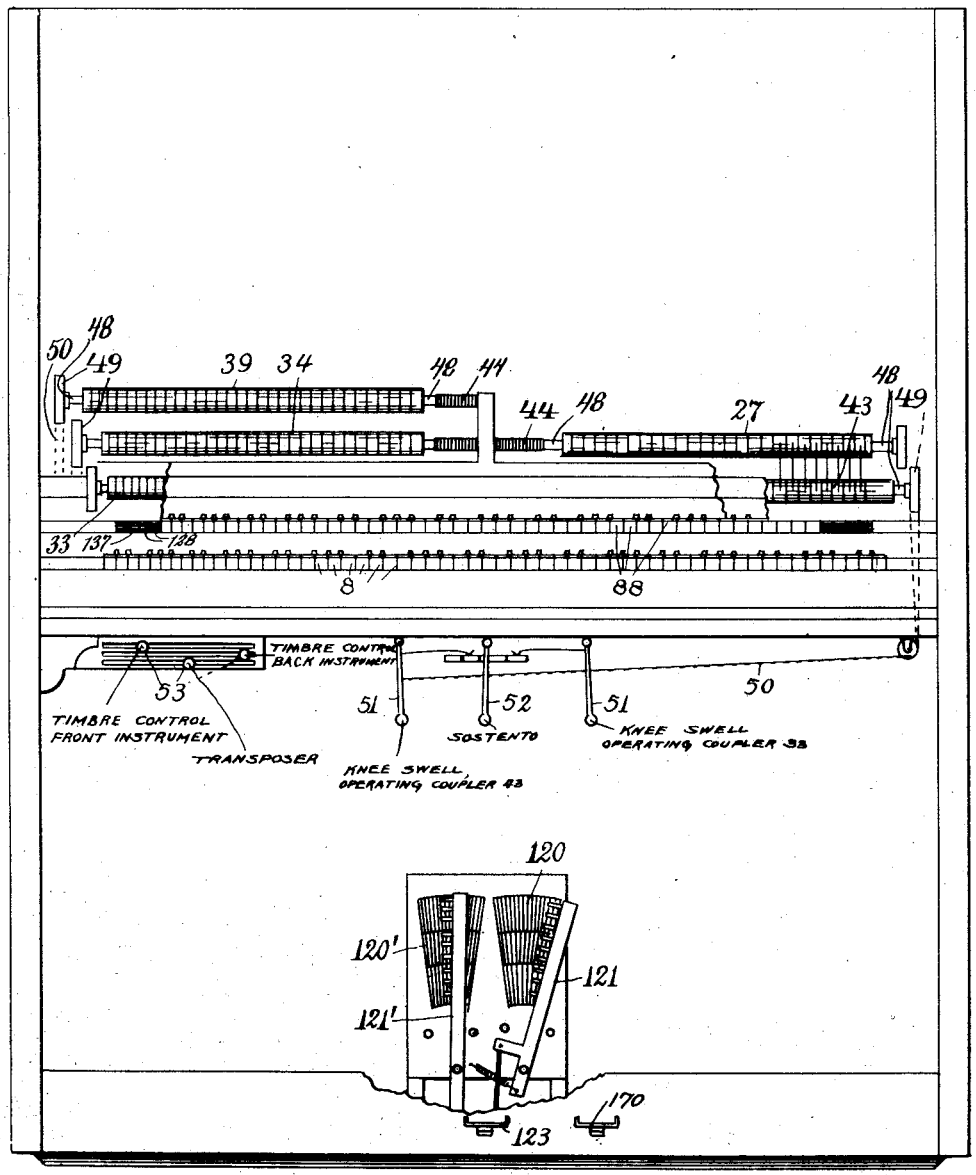

M. L. SEVERY & G. B. SINCLAIR.
ELECTRICAL MUSICAL INSTRUMENT.
APPLICATION FILED JAN. 31, 1913.
1,196,401.
Patented Aug. 29, 1916.
7 SHEETS—SHEET 3.
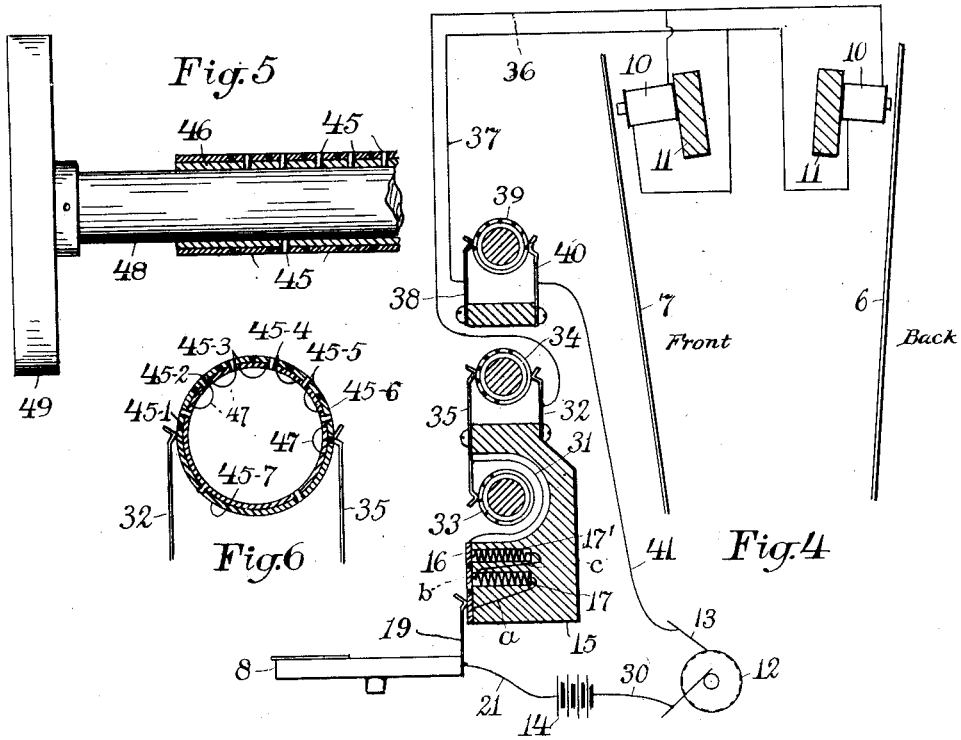
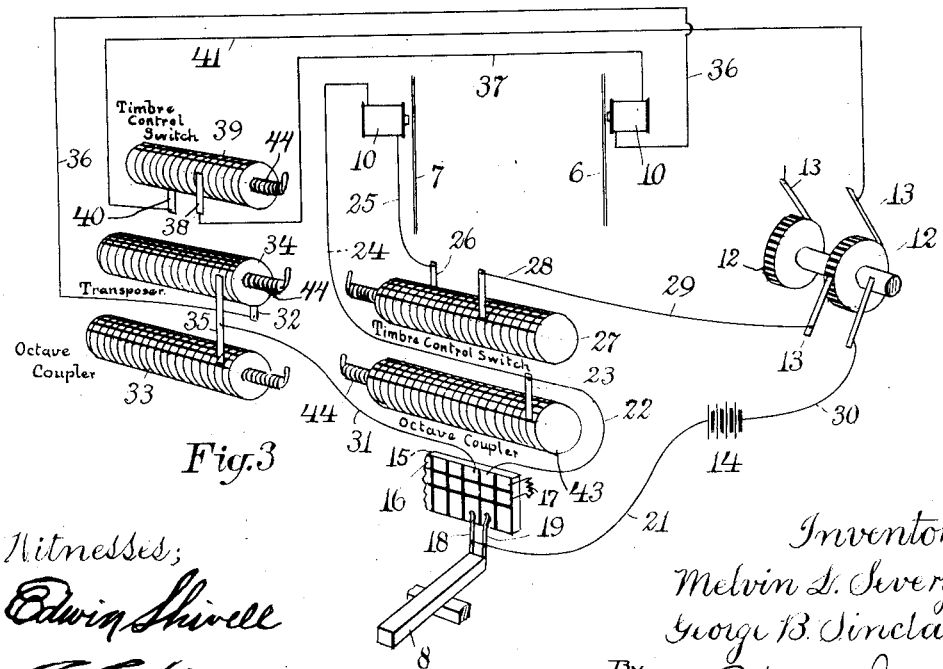

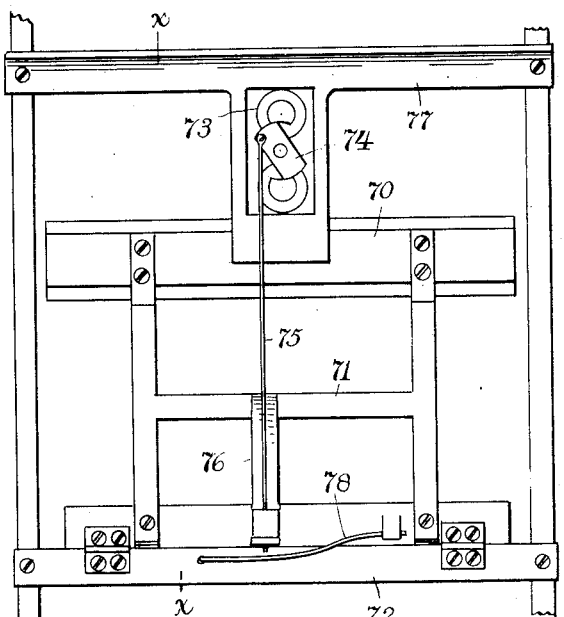
Fig. 7.
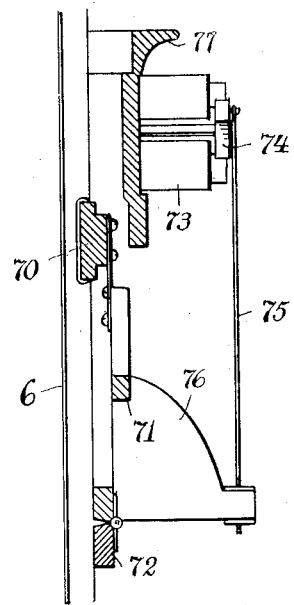
Fig. 8.
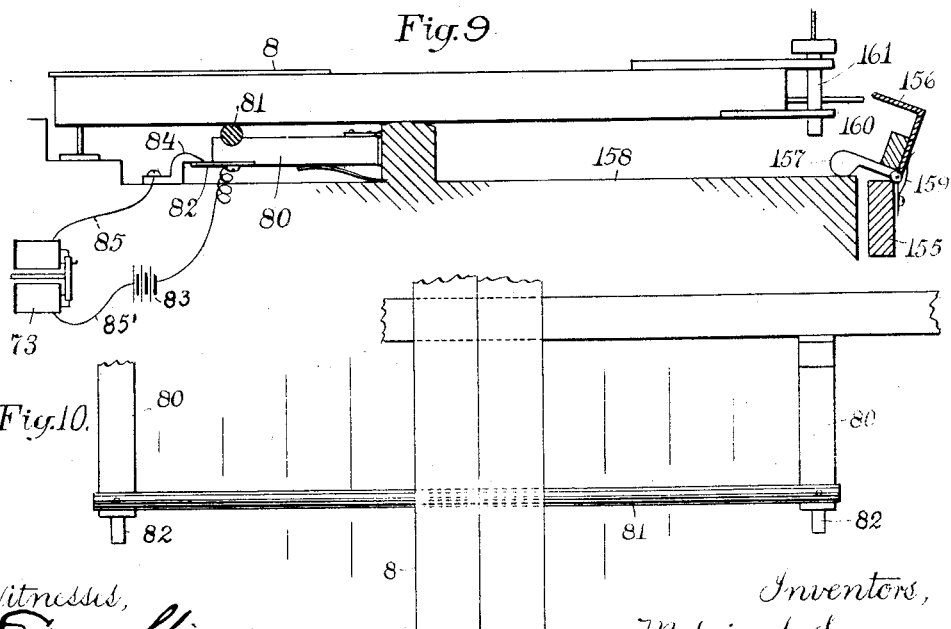

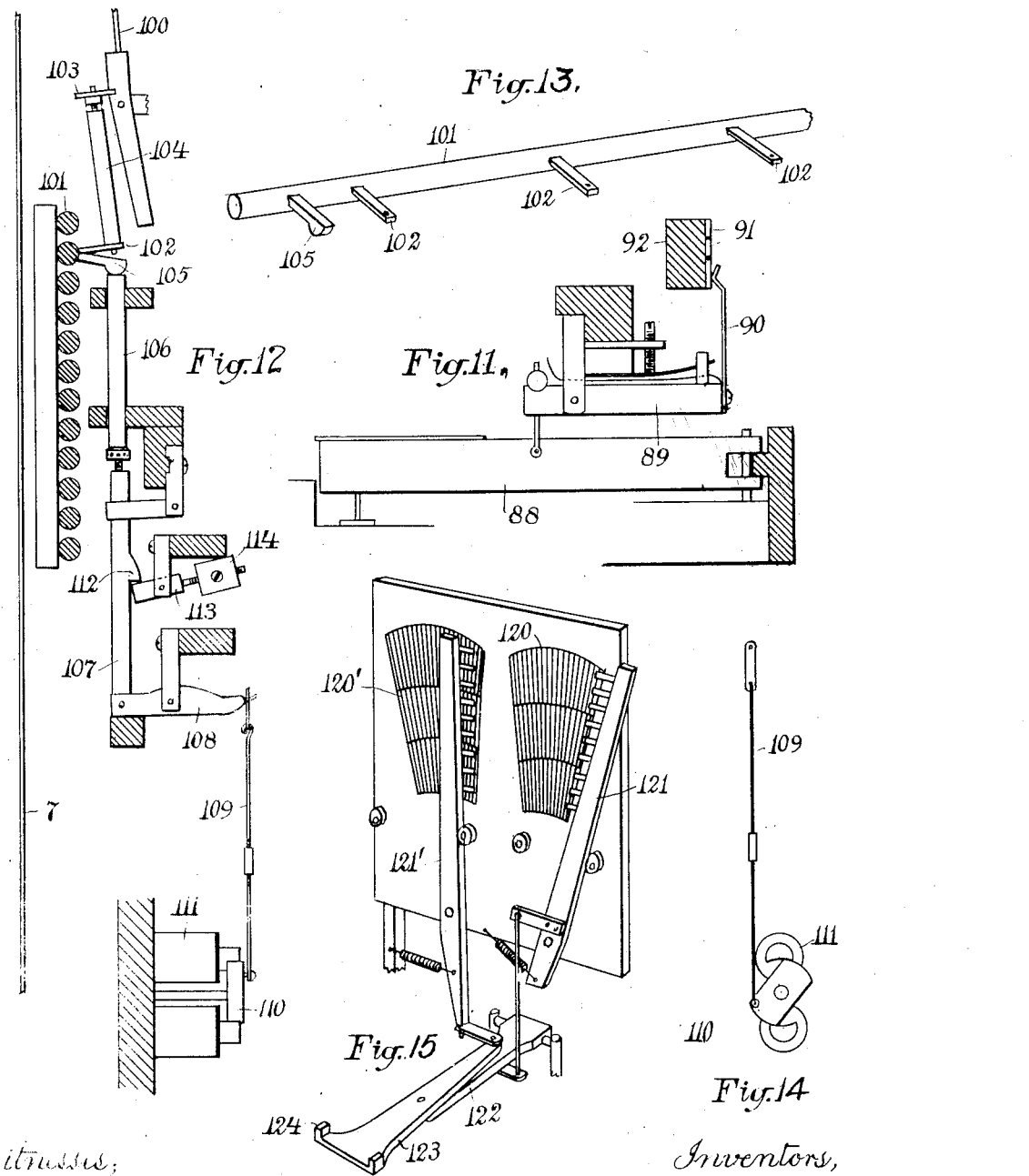

UNITED STATES PATENT OFFICE.

MELVIN L. SEVERY, OF ARLINGTON HEIGHTS, MASSACHUSETTS, AND GEORGE B. SINCLAIR, OF GEORGETOWN, MAINE, ASSIGNORS TO CHORALCELO COMPANY, OF BOSTON, MASSACHUSETTS, A CORPORATION OF MAINE.

ELECTRICAL MUSICAL INSTRUMENT.

1,196,401.  Specification of Letters Patent.  Patented Aug. 29, 1916.

Application filed January 31, 1913. Serial No. 745,400.

*To all whom it may concern:*

Be it known that we, MELVIN L. SEVERY, of Arlington Heights, in the county of Middlesex and Commonwealth of Massachusetts, and GEORGE B. SINCLAIR, of Georgetown, in the county of Sagadahoc and State of Maine, both citizens of the United States, have invented certain new and useful Improvements in Electric Musical Instruments, of which the following is a specification.

This invention is in the line of musical instruments wherein sonorous bodies are electromagnetically actuated by means of properly timed electric pulsations, and our invention has for its object the construction of an instrument having magnetically attractive strings thus vibrated, wherein a plurality of sets of tuned strings can be actuated through a single key-manual so that the sets may emit vibrations of either like or unlike timbre at will; also wherein a plurality of sets of strings can be actuated through a plurality of banks of keys for enabling the performer to play the air in one quality, and the accompaniment in another, or one loud and the other soft, or to get simultaneously two or more different tone-qualities, and to produce other combinations of timbre, and pitch, impossible to the single instrument.

Our invention relates to certain other improvements in details of construction hereinafter set forth.

In instruments most nearly associated with the embodiment of the preferred form of this invention it is customary, throughout a portion of the compass or range of said instrument, to provide each note with a plurality of strings for the purpose of securing an increase in the volume of tone. Thus, in the piano, the middle and upper notes of its range, or compass, are customarily triple strung, the lowest notes are usually single strung, while those between these two sections are commonly double strung. Where a note is thus provided with a plurality of strings these strings are spoken of as the "unisons" of the note, from the fact that they have to be carefully tuned to the same pitch. We have, therefore, in the piano and similar instruments, a scale or set of tuned notes ranging from the lowest to the highest note of its compass, and many of these notes are made up of unisons. For convenience of description we prefer to call all the strings representing all the notes of the compass of an ordinary piano, a "set", and, similarly, in the invention forming the subject matter of this application, we call the sonorous bodies necessary to fill out any single entire compass from lowest to highest note a "set" of sonorous bodies. The multiple instrument of this application being provided with a plurality of complete compasses or ranges of notes is, therefore, referred to as having a plurality of "sets" of sonorous bodies, the term "sets" being used in this sense and no other, and never applying to those similarly turned sonorous bodies belonging to a single note which, as before stated, are properly known as the "unisons" of a note.

Figure 16:
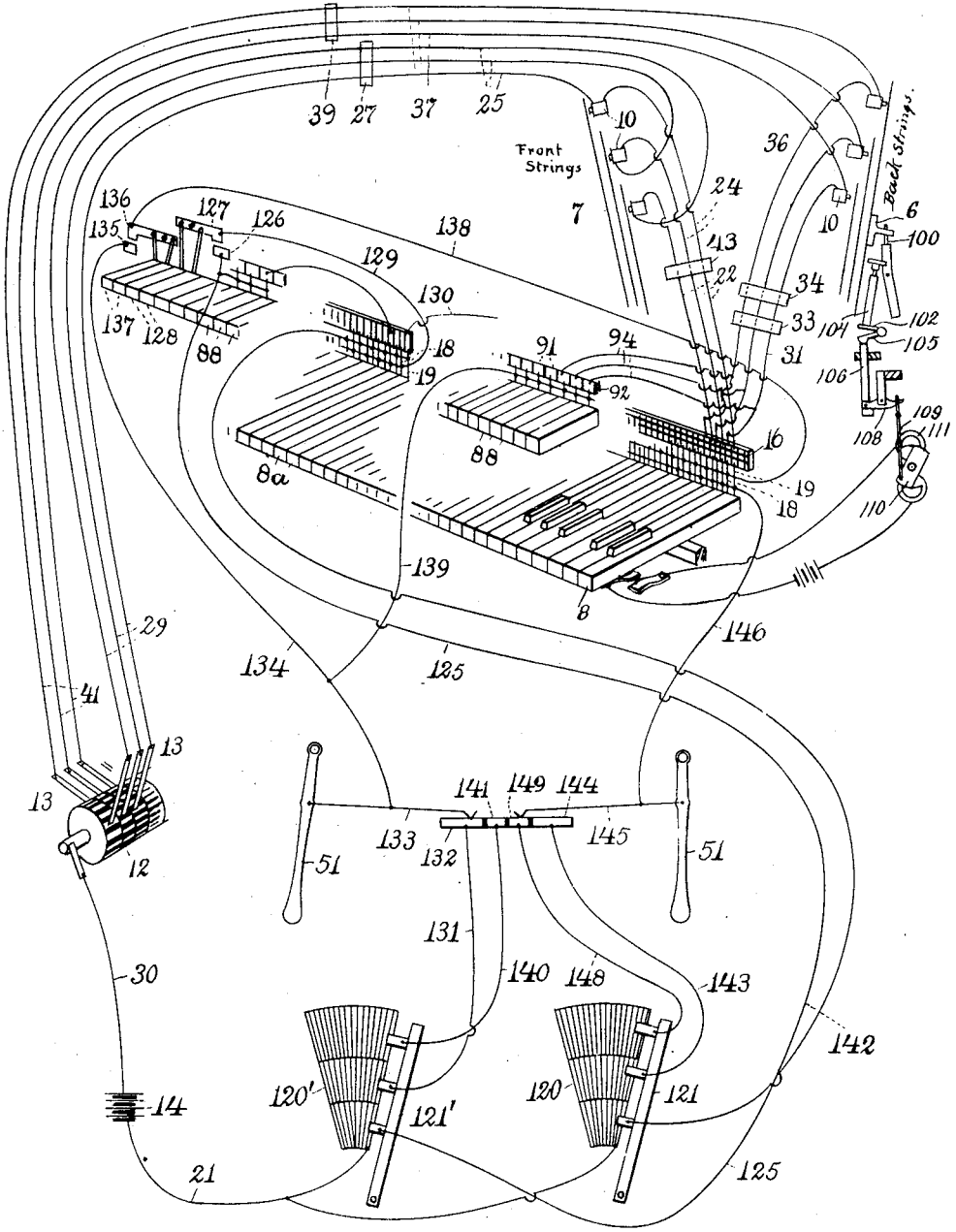
Figure 18:
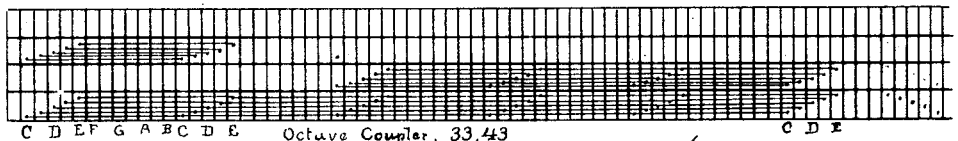
Figure 19:
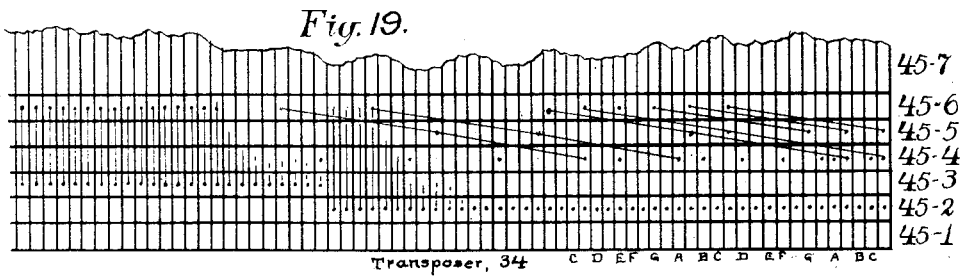
Figure 20:
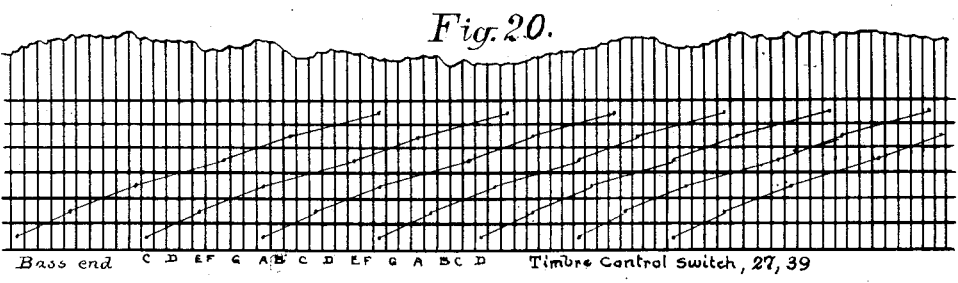
Figures 17, 21, 22:
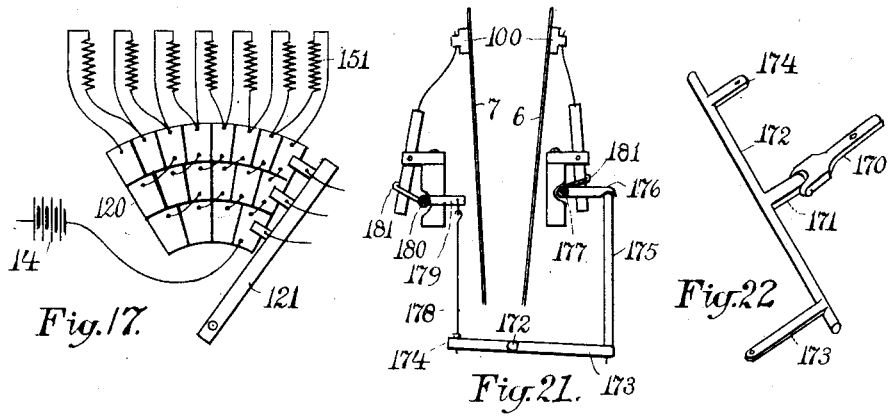

Referring to the drawings forming part of this specification, Figure 1 is a vertical transverse section of a musical instrument made in accordance with our invention. Fig. 2 is a front elevation of the same, with parts thereof broken away and omitted. Fig. 3 is a diagram mainly in perspective showing a single key adapted to control the simultaneous actuation of two separate strings of like pitch, illustrating the relative positions and arrangement of our new type of octave coupler, timbre-control switch and transposer. Fig. 4 is a transverse sectional elevation partially in diagram showing the action rail and the last named parts in connection with one string of each set and its actuating magnet. Fig. 5 is a longitudinal section of a portion of one of the said new type of octave couplers, timbre-control switches, or transposers. Fig. 6 is a cross section of the same on a larger scale. Fig. 7 is a face view of one of the blanket dampers used in connection with the instrument. Fig. 8 is a cross section of the same through the line x—x in Fig. 7. Fig. 9 is a side view of one of the keys in the lower bank showing the actuating means for said damper. Fig. 10 is a plan view of certain keys showing the principal member of said means. Fig. 11 is a side elevation of one of the keys of the upper key-bank and its immediate connections. Fig. 12 is a vertical cross section of the mechanism for operating the dampers in octaves. Fig. 13 is a perspective view of one of the damper-controlling rocker-shafts. Fig. 14 is an end elevation of one of the electromagnets for operating the same. Fig. 15 is a perspective view of the pedal rheostats. Fig. 16 is a diagram, more or less in perspective, showing portions of electric action rails, a plurality of keys, strings, and actuating electromagnets, and the wiring of the same to the pedal rheostats and certain other parts. Fig. 17 is a diagram representing the wiring and resistances of the pedal rheostat. Fig. 18 is a diagram of the wiring of the contacts in each of the octave couplers. Fig. 19 is a diagram of the wiring of the transposer. Fig. 20 is a diagram of the wiring of each of the timbre-control switches. Fig. 21 is an elevation of the pedal damper lift for both instruments. Fig. 22 is a perspective view of the rocker-shaft and pedal connected with the damper lift.

As illustrated in Fig. 1, the reference numeral 1 designates the upper horizontal beam or wrest plank constituting a part of the frame of this instrument and carrying the front and rear string-plates 64; 2 is the bottom beam, and 3 a side of the frame. The string plates 64 are provided respectively with hitch portions 64$^a$ and 64$^b$, the former showing in section in Fig. 1 above the level of the key-board, and the latter showing at the base of the instrument just back of the beam 2 and sounding-board 5. As shown, the upper beam or wrest-plank 1 is considerably wider than the bottom one, so that the two sounding boards 4, 5, fixed to the opposite faces of said frame are inclined at acute angles with respect to each other and also to a vertical plane parallel with the front and rear of the instrument. On the plane where the section is drawn, the base strings 6 are the ones shown as strung on the back sounding board 5, and the upper treble strings 7 on the front sounding board 4.

The key action of the lower bank of keys 8 is similar to that set forth in our companion application Serial No. 273,199; and the hammer action is also much the same; either differing materially from the keys and actions in general use for pianos. The hammers 9 are provided for the front strings alone, however; the back strings being designed to be operated entirely by electricity, while the front strings may be actuated either by the hammers, or by electricity, or by both simultaneously.

The means for electrically actuating the strings consists of electromagnets 10 supported on magnet rails 11 located in proximity to the strings, in suitable openings above the sounding boards; and uniformly rotated make-and-break toothed disks 12 coacting with stationary brushes 13 for suitably pulsating the current delivered to the electromagnets from a suitable source 14, as shown in Fig. 3.

The circuit closing devices operated by the lower keys 8 coöperate with a plurality of rows of contact blocks 16 carried on the front face of rail 15 and insulated one from another laterally, but communicating vertically through resistances 17 which may be graded to any desired ohmic value. The brushes 18, 19, shown in Fig. 3 as carried directly by the inner end of a key 8, but preferably carried by the extension or lever 20 as in Fig. 1, are caused to rise and traverse said contact blocks by the depression of such key. All said brushes 18, 19 are connected by a common wire 21, from the current source 14, only the pair associated with a single key 8 being shown in Fig. 3.

The wiring for the blocks engaged by the brushes 18 and 19 is identical from the source of current to the topmost contact blocks 16, and to that point consists, as shown in Fig. 4, of the wire $a$ to resistance 17 to block $b$ and wire $c$ to resistance 17' to block 16 of the vertical series swept by brush 19. Each topmost block 16 is connected through wire 22, contacting with a brush 23, and via a wire 24 to a front magnet 10 (Fig. 3). From this magnet the wire 25 runs to the brush 26 contacting with the rotary timbre-control switch 27, and also in touch with the latter is the brush 28 joined by a wire 29 to the brush 13 of the toothed disk 12. Hence, when the key 8 is depressed, current from the source 14 traverses the wire 21, brush 19, three or less contacts 16, wires 22, 24, magnet 10, wire 25, brush 26, timbre-control switch 27, brush 28, wire 29, brush 13, disk 12, wire 30, back to said source.

The topmost block 16 in the vertical row traversed by the brush 18 is joined by a wire 31 to the double ended brush 35 which engages both the octave coupler 33 and the transposer 34. Hence as indicated in Fig. 3 the current from the source 14 would traverse in this instance the wire 21, brush 18, contact blocks 16, wire 31, brush 35, transposer 34, thence through the brush 32, and wire 36 to the back magnet 10; then through the wire 37, brush 38, timbre-control switch 39, brush 40, wire 41, brush 13, disk 12 and wire 30 back to said source.

In Fig. 4, the system just described is the only one illustrated, but each of the members 33, 34 and 39, as well as the octave coupler 43 and timbre-control switch 27 of the front series, (see Fig. 3) is constructed and operated in substantially the same way; the only essential differences being those of internal wiring. In constructing said members 33, 34 and 39, and 27 and 43, a metal tube is slipped tightly over a tube of insulating material, as compressed fiber (Fig. 5), and the parts riveted together at areas to become the contact blocks 45. Then two small holes are drilled through each of the sections which are to constitute the said blocks; the metal is sawed through to the fiber tube 46 both longitudinally and peripherally to form said blocks, and the saw scarfs are then filled with insulating cement. The succeeding strips are to cut this compound tube apart on a longitudinal diametrical plane; insert U-shaped wires or staples 47 from within the semi-tubes through said drilled holes for coupling desired contact blocks together, and then mount the halves upon a round rod or dowel 48 of wood or other insulating material. The said dowel is then rotatably supported and provided with a spring, as 44 in Figs. 2 and 3, applied to the member 43, for turning the same in one direction, while a wheel 49 is fixed upon the dowel for its opposite turning. A strap or cord 50 being wound upon said wheel and joined to an operating member, as the left hand knee-swell 51 in Fig. 2, a left hand pressure of the knee against said knee-swell 51 will give the partial rotation desired, said spring returning the dowel and its connected contacts to their initial positions upon withdrawal of the knee pressure.

In practice, we prefer to operate the octave coupler 43 of the front magnets and strings by the left hand knee swell 51; the octave coupler 33 of the back magnets and strings by the right hand knee swell 51; to operate the transposer 34 by one of the three levers 53 (Figs. 1, 2), and the timbre-control switches 27, 39, by the two others of the last named levers, the central knee-swell 52 being designed for the sostenuto device. All of the levers 53 are made to oscillate in the slots shown, being fulcrumed within the instrument, and to each of these levers is secured one end of a tape or band 50, the other end of which is fastened to the wheel 49 on the roller associated therewith, the said tape passing about an intermediate roller for the purpose of changing its direction after the manner of the tapes or bands fastened to 51 (see Fig. 2), the spring 44 fastened to the aforesaid roller returning the same in one direction when the lever 53 is freed to slacken said tape.

For about two or three octaves in the base section of both front and back strings of the instrument, we provide a blanket damper preferably held normally in contact therewith by electromagnetic means, and adapted to be withdrawn from the strings whenever any one or more of the corresponding keys are depressed; the object being to improve the base damping by aiding the ordinary dampers. (See Figs. 7 and 8.) Each blanket damper comprises a horizontal felt-covered pad 70 flexibly supported upon the frame 71, said frame being hinged at its lower edge to the bar 72 suitably fixed; a magnet 73 being provided for normally keeping said pad pressed against the selected strings. This magnet acts through its revolving armature 74 joined by a link 75 to the arm 76 and is supported by the fixed bar 77. So long as current is in this magnet 73 said damper pad is held in contact with the strings, but the instant the circuit is broken the spring 78 withdraws the pad from contact. The means for making and breaking the circuit consists of the two spring supported hinged arms 80 carrying the long rod 81 at their free ends close beneath the keys associated with said selected bass strings; the contacts 82 projecting from said arms and wired to the current source 83; the fixed contacts 84 wired to the electromagnet 73, as by wire 85; and a connection between said magnet and source, as 85'. Upon depression of one or more of said keys the contacts 82 and 84 associated therewith are separated, the circuit is thereby broken, and the damper is permitted to swing away from its strings.

Although the instrument is complete and operable with front and back strings and with only the keys constituting the lower bank of the illustrated embodiment of the invention, we prefer to provide also an upper bank of keys 88, shown in Figs. 1 and 2. These keys 88, as will be seen upon referring to Fig. 11, are pivoted at their rear ends to a suitable support such as is employed for organ keys. Above the inner half of each key 88 is a lever 89, fulcrumed at a point between its ends, and carrying at its rear end a brush 90 which engages one of a series of contacts 91 carried by the action rail 92. This rail 92, its contacts and resistances, are similar to the front action rail 15, its contact and resistances, except that the contacts of rail 92 are not double or arranged side by side in pairs, and that the keys are provided with single brushes 90, as seen in Fig. 11, instead of being furnished with double brushes such as indicated at 18 and 19 in Fig. 3.

As shown in Fig. 16 each upper contact 91 in the action rail 92 is connected by a wire 94 to a wire 31, which is connected to the corresponding upper contact 16 connected with the back magnets and strings,—that is, to the upper of the contacts engaged by the brush 18, in Fig. 3; the wire 94 constituting a part of each connection being indicated in Figs. 1 and 16. As thus coupled, the lower bank of keys will play both the front and back strings, and the upper bank of keys will play the back strings alone, although the actuation of the back strings by the lower bank of keys can be cut out by the above described transposer 34. The switches for cutting out the operation of the back strings by the upper bank of keys, as well as cutting in or out certain other circuits, will be described hereinafter.

The mechanism for enabling the dampers 100 to be simultaneously removed at will from all the strings of like scale-name, as the C-strings for instance, is illustrated in Fig. 12, the construction being the same for front and back strings, though but one of said sets of strings is shown in said figure. At a proper distance below said dampers 100 are located twelve rockershafts 101, each having as many radial arms 102 projecting therefrom as there are octaves whose dampers are to be moved. Between each arm 102 and a finger 103 projecting from a damper to be controlled, is a sticker 104, each such sticker adjustable for regulating purposes. Through the rocking of any one of said rockershafts 101 and the consequent upward movement of its arms 102, all the connected dampers 100 will be swung out of contact with their associated strings. To rock said shafts electrically, each thereof is provided with an arm 105 beneath which is a slender rod 106 slidably held and in its turn resting upon the adjusting screw of another rod or post 107. This rod 107 is elevated by the intermediately pivoted lever 108 whose opposite end is joined by a link 109 to the rocking armature 110 controlled by the electromagnet 111. See Figs. 12 and 14. Whenever current is switched to said magnet, as will be done on depression of a key, through connections of the character illustrated in Figs. 1 and 16, said armature swing toward a vertical position, and through the above described connections, all the dampers associated with strings of a designated scale name,—as D for instance,— are withdrawn from such strings. As shown, there are twelve of these magnets, one for each of the rockershafts 101. The moment the current to said magnet ceases, the rod 106 and post 107 drop to their normal positions. To prevent the shock which such drop would otherwise produce, we form the post 107 with a lug 112 adapted to engage the short end of the weighted lever 113 and to tilt the same to the position illustrated in Fig. 12 by the superior pressure of the parts associated therewith. When the post 107 rises in the removal of the dampers, the weight 114 sinks to its lowermost position, while the lug 112 ascends to a substantial distance above the short end of said lever 113. The moment the actuating current ceases, the parts 106 and 107 fall until the lug 112 meets said lever 113 and is checked thereby momentarily or until the inertia of weight 114 is overcome, and the parts are allowed to complete their descent gradually subject to the resisting influence of said weight. This damper mechanism including the shock absorber, is set forth in detail in our pending application Serial No. 757,872, filed March 31, 1913, and hence is not specifically claimed herein, but is shown and described to afford a better understanding of the instrument as a whole.

For varying the resistance in the circuits of the string-actuating electromagnets, and thereby changing the expression of the instrument as a whole, we employ a pedal-operated rheostat shown in Figs. 15 and 16. Our means for operating the brush-carrying arms comprises the twin-pedal, the part 122 of which is terminally pivoted to swing vertically, while the part 123 is centrally pivoted on the other part to swing horizontally. The part 122 is connected with one arm 121 in such a manner as to swing the same by a depression of the twin-pedal, as shown in Fig. 15, and the part 123 is connected in a manner to move the other arm 121' by a horizontal swing. The pedal part 123 being formed with ears 124 positioned to fit the sides of the operator's foot, a lateral motion given to such foot will operate the said arm 121', while a downward pressure of the foot operates the other arm.

The wiring between the pedal rheostat and the other elements of the instrument is as follows: Referring to Fig. 16, it will be seen that the wire 21 from the current-source 14 enters each pedal rheostat 120, 120' at its lower right-hand contact, which is in circuit with both of the right-hand contacts in the two curved rows above, as shown in Fig. 17. Referring to Fig. 16, from the lowest brush of the first arm 121', a wire 125 connects with the contact 126 of the switch 127. Said switch being pivotally supported and linked at opposite sides of the pivot-point to the two keys 128, the actuation of one of said keys will bring the switch into engagement with said contact 126, while the actuation of the other key will open the switch. These two keys are solely for switching purposes, having nothing to do with the remainder of the elements of the instrument. From said switch arm 127, a wire 129 passes to all the right-hand brushes 19 of a limited number of the lower bass keys 8ª which brushes are in touch with the contacts from which wires 130 run to the proper front electromagnets 10 not shown. The return from such magnets is similar to that above described, being by way of the wires 25, switch 27, wires 29, brushes 13, make-and-break disks 12 and wire 30 back to the source 14; the wires and magnets illustrated in Fig. 16 not being the ones actually in circuit with the action rail of said bass keys, but those associated with certain treble keys 8. The middle brush of said rheostat arm 121' is joined by the wire 131 to the contact 132 engaged by the brush 133 moved by the left-hand knee-swell 51; and from said brush a wire 134 extends to the contact 135 coöperating with the switch arm 136, which is operated by the two keys 137 in the same manner as the switch arm 127 is operated by the two keys 128. Said switch arm 136 is joined by a wire 138 to all the brushes 18 whose associated contacts 16 are wired to the back magnets 10. The wires 31 from said contacts connect with the octave coupler 33 and the transposer 34; the latter being joined by wires 36 to said back electromagnets 10 as shown in detail in Figs. 3 and 4. The topmost brush of said first rheostat arm 121' is joined by a wire 140 to the contact 141, which, when said left-hand knee-swell 51 is swung toward the right, is put into circuit with the switch members 135—136 above described, and also by wire 139 with the brushes of the treble upper bank of keys 88 whose contacts 91 are joined by wires 94 to the wires 31. The lowest brush of the right-hand rheostat arm 121 is connected by a wire 142 to the brushes 19 of the said selected set of bass keys 8ª; said brushes being those whose associated contacts 16 are wired to the front electromagnets 10 (not shown). The intermediate brush on said rheostat arm 121 is joined by a wire 143 to the contact 144, and the brush 145 which can be moved into touch therewith by the right hand knee-swell 51, is connected by wire 146 to the brushes 19 traversing contacts which are wired to the front electromagnets 10; the latter connections comprising the wires 22, octave coupler 43 and wires 24. The topmost brush of said rheostat arm 121 is joined by a wire 148 to the contact 149, shown put in circuit with the front magnets in the same manner.

The construction of each pedal rheostat 120, 120' is shown in Fig. 17. Its contacts in the upper row are wired to each other in series through resistances 151, and the contact blocks of the two lower rows are each one wired to a contact in the two above it of a number identical with itself, the number of each contact being determined by its position in its own row counting from the right. We show but four contacts in the lower row, in Fig. 17, but it is evident that in practice any desired number may be used in each row. This causes the entire sweep of the lowermost brush to engage the fourth lowermost contact, and so be put in circuit with the fourth of the topmost contacts and with three of the resistances 151. An entire sweep of the intermediate brush brings the latter into touch with the sixth of the intermediate row of contacts, and hence in circuit with five of said resistances; while the full sweep of the topmost brush brings it to the eighth contact, and so in circuit with seven resistances.

With the rheostats 120 and 120' thus constructed, if the octave coupler be brought into circuit by moving brush 133 into touch with contact 132 and thus completing the circuit through the intermediate brush and contacts of rheostat arm 121', fewer of the resistance coils 151 will be introduced into the circuit under a given adjustment of said arm than if said circuit were completed by placing brush 133 in contact with block 141, and thereby causing the circuit to be completed through the upper series of contacts and uppermost brush of said rheostat arm 121'. The purpose of providing such lesser resistance is to give to the coupled electromagnets 10, adequate current to maintain the strength of vibration of each string actuated by the coupled magnets. The movement of the knee-swell 51 is, through this construction, made to reduce the resistance as the brush 133 controlled by such knee-swell is moved from one to the other contact block.

To reduce the strength of the actuating current to the treble electromagnets when the octave coupler is not in use, the left-hand knee-swell 51 is allowed to bring its brush 133 into touch with the contact 141, and so cut out the intermediate brush of the rheostat arm 121', and switch in the topmost of said brushes and the range of resistances 151 in circuit therewith.

The lowermost brush of the right hand rheostat arm 121 switches into the circuit of the electromagnets 10 of the selected bass keys 8ª less resistance for the same angular movement than does the intermediate brush into its connected circuit. The upper brush of the rheostat 120 is normally in connection with the treble electromagnets 10, but when the right-hand knee-swell 51 is operated to carry the brush 145 from the contact 149 to the contact 144 the middle brush is put into connection with said electromagnets 10 instead of the upper brush, thus bringing into circuit lower resistances when the octave coupler is used. In this manner, the expression of the front and back sections of the instrument can be varied at will, either being modulated independently of the other, while at the same time a due balance is maintained in each, and the loudness and softness of the notes played is entirely controllable by the player irrespective of the number of notes simultaneously sounded.

While we show in this application but one way of varying the loudness of the tones emitted from the various sets of sonorous bodies relative to each other, viz: that of variable rheostats, one for each said set of sonorous bodies as illustrated in Fig. 16, we do not confine ourselves to this method, as any method of varying at will the attractive force exerted between the sonorous armatures of one set and their respective electromagnets relative to that exerted between the electromagnets and associated sonorous armatures of other sets comes well within the scope of our invention. In our companion application Serial No. 380,987 we have shown several ways of varying the attractive force exerted between the electromagnets and their associated sonorous bodies, in the case of an instrument having a single set of sonorous bodies, and any of these ways are similarly applicable to instruments having a plurality of said sets of sonorous bodies. Similarly we show herein but one means of enabling the player at all times to control the loudness of his music irrespective of the number of sonorous bodies simultaneously sounding, but any means of accomplishing this result comes well within our invention and in our companion application Serial No. 377,571 we have shown several such means.

The conception of a musical instrument having a plurality of sets of electromagnetically actuated sonorous bodies, adapted to be played with any relative degree of loudness, this loudness being at all times under the control of the player and sensibly independent of the number of sonorous bodies simultaneously sounding,—to have the tone color of the various sets varied at will independently of each other, and these different timbres coupled in any suitable way and mixed in any desired proportion, thus producing tonal effects in infinite variety and gradation, we believe to be new and original with us, and we desire therefore the fullest protection which the circumstances warrant.

Our mechanical sostenuto device for enabling any depressed keys of the lower bank 8 to be seized and played at the will of the operator, is set forth in detail in our Patent No. 1,068,010, dated July 22, 1913, but to make clear the relation of the various elements of the complete instrument here shown, it may be briefly described as follows: As shown in Figs. 1 and 9, a vertically slidable bar 155 has hinged to its upper edge a member carrying a substantially horizontal blade 156. A finger 157 rigid with said blade and resting on the fixed surface 158 keeps the spring 159 from throwing said blade toward the keys. A pin 160 held by the vertically slidable pencil 161, and normally in substantially the position represented in Fig. 9, will come beneath the blade 156 when the latter moves forward under the influence of the spring 159 upon the elevation of the bar 155, and when the key 8 is in its normal position. Consequently, when said bar is elevated still higher, as it is in carrying out its purpose, said blade will not engage and elevate the pins 160 and associated keys unless the latter have first been depressed at their operative ends. Any keys that have been thus depressed before the bar 155 has been elevated will, however, have their pins engaged by the upper surface of the blade 156 and raised thereby to a point to hold such keys in their depressed position, thus causing their associated electromagnets to continue to actuate their strings as long as such sostenuto bar is held up.

By lowering the bar 155 just far enough for the finger 157 nearly to touch the fixed surface 158, and then elevating it again, the seized keys can be repeatedly operated and their associated strings actuated as often as desired. The pin 160 and its attached pencil 161 are made slidable relative to the key in order that when other keys are operated during the period in which the previously operated keys are being held depressed by the blade 156, the pins of the first-named keys will not be interfered with by the under surface of said blade. We prefer to elevate said bar 155 by means of the center knee-swell 52 mechanically connected therewith in any suitable manner, as for instance through the link connection 54 shown in Fig. 1.

For the octave couplers, the wiring of which is indicated in Fig. 18, as though the surface thereof had been unrolled to a flat plane, we prefer to provide the same with four rows of contacts, the upper one of which is void of wiring and hence without effect upon the brushes in contact therewith; the next row below it is wired for the lower sections of the instrument alone, preferably for the two lowest octaves thereof; the third row is preferably wired for all the octaves except those of the second row, and some of the extreme treble notes; and the lowest row is wired for the octaves of the entire range or compass of the instrument save the extreme treble. Hence when the rotary octave coupler 43 or 33 is in position to present the first-mentioned row to the brushes 23 or 35, it will have no effect upon the instrument. A turn to present to the brushes the second row will couple the octaves in the low bass. A further turn to present the third row to the brushes will couple all the octaves of the instrument save the lower bass and some of the higher notes. A further turn to present the fourth row to the brushes will couple all the octaves of the instrument, or a few notes less in actual practice. Fig. 18 does not illustrate the wiring between all the contacts which are in practice coupled together, but enough thereof to indicate the arrangements outlined.

In both the transposer and the timbre-control switch, the contact blocks are preferably in seven longitudinally extended rows, as in Fig. 6, one of which is substantially a semi-circumference, while the six others are each about one-twelfth of a circle. The blocks 45—6 are in electric connection with the wide blocks 45—7, so that when the opposing brushes 32, 35 are in contact with both, the influence of the same will be simply that of a conductor. In other words, it will effect no change in the conditions of the wiring more than if it were removed and the wires 31, 36 joined to each other directly.

In the transposer the wiring of the blocks 45—2 is such that the lower two octaves of the bass back strings will be cut out when the wheel or pulley 49 is turned to bring the last-named blocks in touch with one set of brushes. A further partial turn to present the blocks 45—3 into touch with one of said brushes, will act upon the back instrument's electromagnets 10 to cut out all but the two octaves of the bass thereof. The blocks 45—4 are so wired as to transpose the affected notes two octaves lower; the blocks 45—5 are wired to carry the affected notes down one octave, and the blocks 45—1 are left unwired, contact therewith opening the circuits and rendering the back magnets and strings dead.

The wiring of the transposer 34, in order to perform the functions hereinbefore described, is indicated in Fig. 19 in the same way as in the octave coupler in Fig. 18. As here shown, about two octaves of the bass end thereof have the row of contacts 45—6 wired to the row 45—3 in the same vertical row; while the remainder of the contacts in said row 45—6 are similarly wired to the contacts 45—2. In addition, each contact in the row 45—4 is wired to a contact in the row 45—5 an octave away toward the bass end, and each contact in the row 45—5 is wired to a contact in the row 45—6 an octave away in the same direction, so that the row 45—4 has its contacts wired two octaves distant in the row 45—6. The octave is indicated by counting the thirteenth contact block inclusive.

In each timbre-control switch, a preferred wiring of which is indicated by Fig. 20, the contacts in the topmost of the six rows of small contact blocks are wired to the contacts in the row below the eighth to the left, inclusive. Each contact block in the second row is wired to a contact in the row below it the sixth inclusive therefrom; each contact in the third row is wired to the eighth contact in the row below; each contact in the fourth row to the sixth in the fifth row, and each in the fifth row, to the fifth in the lowermost row. Hence in using the timbre-control switch, the pressure of a certain key will switch into its associated electromagnet 10 pulsations of a higher frequency than its normal or fundamental, so that the musical note produced will be both of a different timbre, or quality, and of a higher pitch. If at the same time the transposer be used, the string which is thus being made to produce a tone of different quality and higher pitch, can be put into the control of the higher key appropriate to such higher pitch. Hence when we desire to have the instrument emit a different treble quality, we do not require to play the bass keys to produce the same, but can continue to play the keys in the treble.

The drawings and specification appear to indicate that each electromagnet 10 actuates but a single string. This is done for simplicity in disclosure, as we usually have many of the notes comprise from two to three strings each. Hence the expressions "a sonorous body," "a string" may signify a plurality thereof acting as one. The wiring shown in the octave coupler, transposer and timbre-control switch is that which we at present prefer to use, but we do not confine ourselves to any definite number or kind of changes, as it is evident we might desire to extend the number in some cases, while in other cases we might wish to change or omit some of them.

The timbre-control switch by itself determines what pulsations shall enter the magnets opposite to the keys pressed; whereas, the action of the transposer determines what magnets shall respond to the pressure of a given key.

While we term the switch 34 a "transposer" we do not wish to be understood to use that term in its strict musical sense as the function of this switch is composite and no part of it is for the purpose of transposition in the musical sense, the direct opposite being much nearer the case, since by this switch changes in timbre can be effected from the same portion of the keyboard, whereas mere changes in pitch, having a similar purpose, are usually effected from different portions of the keyboard.

We have shown here but one type of timbre control and transposer switches, but we do not confine ourselves to these particular constructions. We have shown in companion applications other means of accomplishing these results and we hold that any way of producing these results comes well within the province of our invention and we desire our claims to be interpreted in this spirit.

There are three means for operating the individual dampers, and one for operating the blanket dampers in this instrument as illustrated: first, the mechanically controlled dampers for the front strings, each withdrawn from its string when its key is pressed, as in the usual piano; second, the octave dampers; and third the pedal operated dampers. The octave dampers of the front strings consist of the usual dampers and means for electrically removing them from the strings in octaves, so that the pressure upon any key will up-damp both its associated string and all, or a selected number of all, the strings in octaves therewith. See Figs. 1, 12 and 14. For the back strings, the dampers are not individually operated, but are thus controlled in octaves, as we prefer not to employ the complications of means which would be requisite for their individual actuation. The blanket dampers, as already described, are two in number; one for a selected group of the lower strings of the front section of the instrument, and the other for a selected group of the back strings. See Figs. 7 and 8. The third means for undamping the strings, as shown in Figs. 1, 21 and 22, comprises the pedal 170 engaging the arm 171 of the rocker-shaft 172; a long arm 173 projecting through suitable apertures to the rear of the back sounding board; a short arm 174 in front of the front sounding board; a sticker 175 rising from said arm 173 into engagement with the arm 176 rigid with the rocker-shaft 177; and a link 178 rising from said arm 174 into engagement with the arm 179 rigid with the rocker-shaft 180. Thus constructed, a suitable actuation of the pedal 170 rocks the shaft 172 and both rocker-shafts 177 and 180 with their arms 181, and thereby withdraws all the dampers on both the front and back strings out of contact therewith, whenever such action is temporarily desired.

The means for rendering the hammers of this instrument inoperative consists of the thin bar 165 (see Fig. 1) located behind the jacks of the hammer action, and adapted to throw all thereof out of engagement with the hammers by a slight tilt or rock given to it in any suitable way, as by the lever arm 166. Said bar 165 being pivoted or hinged along one edge, a turn thereof from its normal vertical position disengages the jacks as described. The disengaging mechanism just described is not *per se* claimed herein, being set forth and claimed in our application Serial No. 273,199, filed August 7, 1905.

The instrument being constructed as above set forth, its player, by switching off the current and placing the just-described bar 165 in a vertical position can use the hammers alone, as in any piano. Or, by switching on the current and turning said bar, can play the instrument electrically. Or he can use both electric and percussive means simultaneously. Or he may employ the hammers for the front set of strings, and the electricity for the back set of strings alone.

Then, by suitably changing the transposer or the timbre-control switch, or both, he may actuate the front strings with the hammers, simultaneously with an electric actuation of the same upon a different pitch, or with a portion of them alone electrically actuated; and at the same time play the back strings, through the upper or lower or both banks of keys, in a different quality still, through a turn of the proper switch.

We might continue to describe almost indefinitely the many combinations, variations, and permutations in qualities, pitch, selected strings, coupled strings, and other effects of which this instrument is capable, but the above is enough to give a hint of its possibilities.

It is obvious that this instrument lends itself most readily to mechanical manipulation by means of traveling perforated music rolls, and the like, as found in the mechanical players at present on the market most of which operate to press the keys of the ordinary keyboard. Any means, however, of opening and closing the appropriate electrical circuits, whether through the operation of the keys of the keyboard or otherwise, would come well within the scope of our invention, and whenever, therefore, we herein refer to "keys" we wish to be understood to include within that term any mechanism operating to produce the results for which said keys are designed, as it is manifest that the various circuits of this instrument could be opened and closed mechanically, either with or without the use of a keyboard. We do not, therefore, limit ourselves either in this specification or the claims to an instrument operated only by the usual pressure of the keys of a keyboard, but desire to include any means by which this instrument may be operated by a mechanical or human player.

What we claim as our invention and for which we desire Letters Patent is as follows, to wit:—

1. A musical instrument comprising a plurality of sets of magnetically attractive sonorous bodies, each said set consisting of a multiplicity of sonorous bodies tuned in musical relations to each other, electromagnets for vibrating these sonorous bodies, means for delivering to said electromagnets properly timed electric pulsations, keys for controlling the passage to said electromagnets of the actuating current, and means operative at will for putting predetermined groups of said keys into or out of controlling relation with said electromagnets.

2. A musical instrument having a plurality of sets of magnetically attractive sonorous bodies, electromagnets for actuating these bodies, damping mechanism for suppressing their vibration, means for delivering to the actuating magnets properly timed impulses and keys controlling the passage of these impulses to the actuating magnets and operating said damping mechanism.

3. A musical instrument comprising duplicate sets of magnetically attractive sonorous bodies; electromagnets for vibrating said bodies; means for delivering to said electromagnets properly timed electric pulsations; circuits for said electromagnets; keys controlling the delivery of pulsations to said electromagnets, certain of said keys serving to close simultaneously circuits of both sets of magnets; and means operative at will for interrupting the circuits connecting one set of magnets with said certain keys, and thereby removing said magnets and their associated sonorous bodies from the control of said certain keys.

4. A musical instrument comprising a plurality of sets of magnetically attractive sonorous bodies, each said set consisting of a multiplicity of sonorous bodies tuned in musical relations to each other, electromagnets for actuating said bodies, keys controlling the passage to the actuating magnets of the current energizing them and means operative at will for changing the tone quality emitted by any one or more of the sets of the sonorous bodies.

5. A musical instrument comprising a plurality of sets of magnetically attractive sonorous bodies each said set consisting of a multiplicity of sonorous bodies tuned in musical relations to each other, electromagnets for vibrating these bodies, means for delivering to said electromagnets properly timed electric pulsations, keys for controlling the passage to the electromagnets of the current energizing them and means operative at will for changing the rate of pulsations delivered to any one or more sets of electromagnets and the rate of the consequent vibrations imparted to their corresponding sonorous bodies.

6. A musical instrument comprising a plurality of sets of magnetically attractive sonorous bodies each said set consisting of a multiplicity of sonorous bodies tuned in musical relations to each other, electromagnets for vibrating these bodies, means for delivering to said electromagnets properly timed electric pulsations, keys for controlling the passage to the electromagnets of the current energizing them, electric damping mechanism for each set of sonorous bodies and means operative at will for causing the action of the keys to energize electromagnets other than those normally operated by them.

7. A musical instrument comprising a plurality of sets of magnetically attractive sonorous bodies each said set consisting of a multiplicity of sonorous bodies tuned in musical relations to each other, electromagnets for vibrating these bodies, means for delivering to said electromagnets properly timed electric pulsation, keys for controlling the passage to the electromagnets of the current energizing them, damping mechanism for each set of sonorous bodies, means operative at will for changing the rate of pulsations delivered to any one or more sets of electromagnets and the rate of the consequent vibrations imparted to their corresponding sonorous bodies, and means operative at will for causing the actuation of the keys to energize electromagnets other than those normally operated by them.

8. A musical instrument having a plurality of sets of magnetically attractive sonorous bodies, electromagnets for actuating these bodies, means for delivering to the actuating magnets properly timed pulsations, a plurality of keyboards controlling the passage of these impulses to the actuating magnets, damping means controlled by the keys for suppressing the vibration of the sonorous bodies, means operative at will for rendering inoperative the pulsation means from any bank of keys to any set of electromagnets, and means for changing at will the rates of pulsations delivered to any set of electromagnets.

9. A musical instrument comprising a plurality of sets of magnetically attractive sonorous bodies, each said set consisting of a multiplicity of sonorous bodies tuned in musical relations to each other, electromagnets for vibrating these sonorous bodies, means for delivering to said electromagnets properly-timed electric pulsations, keys for controlling the passage to said electromagnets of the actuating current, hammers actuated by the depression of said keys for one of said sets of strings, means operative at will for rendering said hammers incapable of operation, and means operative at will for rendering any of said sets of electromagnets incapable of operation.

10. A musical instrument comprising a plurality of sets of magnetically attractive sonorous bodies, each said set consisting of a multiplicity of sonorous bodies tuned in musical relations to each other, electromagnets for vibrating these sonorous bodies, means for delivering to said electromagnets properly timed electric pulsations, keys for controlling the passage to said electromagnets of the actuating current, dampers for suppressing the vibrations of both sets of the sonorous bodies; hammers for one of said sets of strings, actuated by the depression of said keys, means operative at will for rendering said hammers incapable of operation, and means operative at will for rendering any of said sets of electromagnets incapable of operation.

11. A musical instrument comprising a plurality of sets of magnetically attractive sonorous bodies, some more remote than others from the actuating keys, electromagnets for vibrating these sonorous bodies, means for delivering to said electromagnets properly timed electric pulsations, keys for controlling the passage to said electromagnets of the actuating current, and electrically operated means for damping some of the sets of sonorous bodies more remote from the actuating keys.

12. A musical instrument comprising a plurality of sets of magnetically attractive sonorous bodies, electromagnets for vibrating these sonorous bodies, means for delivering to said electromagnets properly timed electric pulsations, keys for controlling the passage to said electromagnets of the actuating current, and electrically operated means whereby the movement of each key in the act of playing causes the operation of the dampers of notes bearing octave relationship throughout the whole or any selected part of the instrument.

13. A musical instrument comprising a plurality of sets of magnetically attractive sonorous bodies, electromagnets for vibrating these sonorous bodies, means for delivering to said electromagnets properly timed electric pulsations, keys for controlling the passage to said electromagnets of the actuating current, dampers for all the said sets of sonorous bodies, and electrically operated means for simultaneously actuating the dampers corresponding to sonorous bodies of like note-name in the musical scale.

14. A musical instrument comprising a plurality of sets of magnetically attractive sonorous bodies, electromagnets for vibrating these sonorous bodies, means for delivering to said electromagnets properly timed electric pulsations, keys for controlling the passage to said electromagnets of the actuating current, octave and blanket-damping mechanism, and electrically operated means whereby the movement of certain keys in the act of playing operates parts of said damping mechanism acting not only upon the sonorous bodies of the same note-name as, and corresponding to, the particular keys played, but also upon a plurality of other such sonorous bodies in the vicinity of those corresponding to the keys played upon.

15. A musical instrument comprising a plurality of sets of magnetically attractive sonorous bodies, electromagnets for vibrating these sonorous bodies, means for delivering to said electromagnets properly timed electric pulsations, keys for controlling the passage to said electromagnets of the actuating current, and electrically operated means in combination with mechanically operated means for damping most of said sonorous bodies.

16. A musical instrument comprising a plurality of sets of magnetically attractive sonorous bodies, each set comprising a multiplicity of sonorous bodies tuned in musical relation to one another; electromagnets for vibrating said bodies; a source of electric current; keys controlling the passage of current to said magnets; and means operative at will for coupling together in octave or other predetermined musical relation, selected sonorous bodies of any or all of said sets.

17. A musical instrument comprising a plurality of sets of magnetically operative sonorous bodies each said set consisting of a multiplicity of sonorous bodies tuned in musical relations to each other, keys controlling the passage to the actuating magnets of the current energizing them, electrical means for damping said sonorous bodies and mechanism operative at will for coupling together in octave relations said sonorous bodies and their associated damping means.

18. A musical instrument comprising a case, a frame having a wide cross beam at the top and a narrow bottom beam, within said case, sounding boards on the front and back frames, respectively, a space being provided between the upper edge of each sounding board and top beam, magnet rails located within said spaces and electromagnets supported by said rails, magnetically attractive strings stretched over each sounding board, hammers for striking the strings of one set, the latter having their striking points as near as possible to the fields of said electromagnets, means for delivering properly timed electric pulsations to said electromagnets, and keys controlling the pulsations to both front and back electromagnets.

19. A musical instrument comprising duplicate sets of magnetically attractive strings one set being located back of the other, electromagnets for vibrating the same, means for delivering properly timed electric pulsations to said electromagnets, a keyboard controlling the pulsations to said electromagnets, a second bank of keys located above the first named ones and controlling the pulsations of but one of said sets of electromagnets, means operative at will for preventing delivery of pulsations by the pulsation means through the first-named bank of keys to either set of electromagnets, or through the second-named bank of keys to one of said sets of electromagnets and means for changing at will the rate of pulsations delivered to either or both sets of electromagnets.

20. A musical instrument comprising a plurality of sets of electromagnetically attractive sonorous bodies furnishing the notes of a musical scale; electromagnets for vibrating said sets of sonorous bodies; a keyboard controlling the magnets of said sets, each key being provided with a number of brushes equal to the number of said sets, and each brush having its individual fixed contact in circuit with the electromagnet of the sonorous body which it controls, the several contacts being individual to different sets of said electromagnets.

21. A musical instrument comprising duplicate sets of sonorous bodies, each set having a compass of two or more octaves; hammers for percussively actuating one set of said bodies; electric means for actuating the bodies of each set, said means comprising circuits and electromagnets; keys for actuating said hammers, said keys also controlling the electric means for actuating both sets of said bodies; a second bank of keys independently controlling the electric actuating means of one set of said bodies; and means for switching in and out of circuit any of the electric actuating means.

22. An electric musical instrument, comprising a plurality of sonorous bodies and electromagnets for their actuation, a source of current, circuits including said source and electromagnets, keys controlling said circuits and a current switching device for completing and varying said circuits, said device comprising a rotatable cylindrical body having its surface composed of insulated contact blocks in both longitudinal and circumferential rows internally wired to one another in a predetermined order, each block of one of the longitudinal rows occupying substantially a semi-circumference, two sets of diametrically arranged brushes engaging said blocks and composing parts of said circuits, and said device being provided with means for turning it at will.

23. An electric musical instrument comprising a plurality of sonorous bodies; electromagnets for their actuation; a source of current; circuits including said source and electromagnets; keys controlling said circuits; and a current-switching device for varying the circuits and directing the current, said device comprising a rotatable non-conducting rod, a spring for turning said rod in one direction, a wheel mounted upon said rod, a flexible band partially wound upon said wheel, means for pulling upon said band in a direction to wind the spring, a non-conducting tube mounted upon said rod, a metallic shell surrounding said non-conducting tube and separated into contact blocks arranged in longitudinal and circumferential rows, means fastening the respective blocks to the non-conducting tube, wires each penetrating the non-conducting tube from within and connecting two separated contact blocks, said blocks being connected in predetermined combinations, and brushes contacting with said blocks at diametrically opposite points on the metallic shell.

24. In an electric musical instrument the combination with a source of electric current and branch circuits therefor, of magnetically attractive strings, electro-magnets for their actuation, and means for delivering electric pulsations to said magnets; a series of terminally pivoted keys; a series of levers pivoted above the respective keys, each said lever provided with a brush rising from its end, and each connected with the key beneath it; an action rail provided with a series of contact blocks with which said brushes make contact; and a spring applied to each lever and serving to depress the same, each said brush and the contact engaged thereby being in one or another of the branch circuits.

25. A musical instrument comprising sonorous bodies; electromagnets for vibrating said bodies; a current source; a variable electric resistance device included in circuit with said source of current and the electromagnets; and a pedal or stop connected with said resistance device and by its adjustment varying the amount of resistance included in such circuit, whereby the total loudness of sound from all the bodies at any given time in vibration is controlled.

26. A musical instrument comprising two sets of sonorous bodies; corresponding sets of electromagnets for vibrating said bodies; a current source; two rheostats each in circuit with one or another of the two sets of electromagnets; a pedal or stop; and independent connections between said pedal and and a movable member of each of said rheostats, whereby said rheostat-members may be independently or simultaneously moved at will to vary the resistance in the circuit of either set of magnets.

27. A musical instrument comprising two sets of sonorous bodies; corresponding sets of electromagnets for vibrating said bodies; a current source; conductors connecting said source with the magnets of the respective sets; removable resistances in the circuits of the respective sets; a pedal or stop connected with the resistance devices and capable of movement in different paths through a single member of the player's body, whereby said resistances may be thrown into or withdrawn from either or both circuits independently or simultaneously, or simultaneously withdrawn from one and introduced into the other in any desired proportion, and the total loudness of sound produced by the vibration of the sonorous bodies in either of said sets at any given position of said pedal, is rendered sensibly independent of the number of bodies simultaneously sounded at such time.

28. A musical instrument comprising a plurality of sets of sonorous bodies; electromagnets for vibrating said bodies; a plurality of sets of electric contact pieces, each wired to one or another of said magnets; a plurality of sets of brushes respectively traversing said sets of contact pieces; keys for moving said brushes; a source of current; means for producing correctly timed impulses in said current; circuits including said source of current, magnets, contact pieces, brushes, and impulse-producing means; and switches for cutting out at will the magnets of either or both sets of sonorous bodies.

29. A musical instrument comprising sonorous bodies electromagnetically vibrated, actuating electromagnets, brushes in electric communication with said electromagnets, contact pieces adapted to be traversed by said brushes, a source of current, conducting circuits including said source of current and said electromagnets, current pulsating devices, a cylindrical octave coupler, cylindrical timbre-control switch and cylindrical transposer each at the will of the operator rotatively reciprocating about its axis, and comprising peripherally arranged longitudinal rows of contacts electrically connected in predetermined combinations, and brushes contacting with said cylindrical coupler, transposer and switch in the circuits to said electromagnets and first named brushes.

30. A musical instrument comprising two sets of electromagnetically operated sonorous bodies, magnets for operating said bodies, means for delivering correctly timed impulses to said magnets, keys controlling the passage to said magnets of said impulses, dampers individual to their associated sonorous bodies for damping both sets of sonorous bodies and means under the control of the player for simultaneously undamping both sets of sonorous bodies.

31. A musical instrument comprising a plurality of sets of tuned, magnetically attractive sonorous bodies, electromagnets for actuating said bodies, mechanism for delivering correctly timed pulsations to said electromagnets, keys controlling the passage of said pulsations to said electromagnets, and means operative at will for varying the timbre, the loudness and the pitch of the tones elicited from one said set of sonorous bodies relative to the timbre, the loudness and the pitch of the tones elicited from other said sets of sonorous bodies.

32. A musical instrument having a plurality of sets of electromagnetically vibrated sonorous bodies some of which are supplied with dampers, and electrical means under the control of the player for successively undamping, vibrating and damping any of said sonorous bodies provided with dampers.

33. A musical instrument having a plurality of sets of electromagnetically vibrated sonorous bodies, a keyboard and electrical means whereby the depression of a single key actuates sonorous bodies belonging to a plurality of said sets.

34. A musical instrument having a plurality of sets of electromagnetically vibrated sonorous bodies, a plurality of keyboards each of which is normally associated with one of said sets of sonorous bodies, and means whereby the depression of the keys of any of said keyboards actuates the sonorous bodies of its said normally associated set.

35. A musical instrument having a plurality of sets of magnetically attractive sonorous bodies and electromagnets for vibrating the same, means for delivering to said electromagnets properly timed pulsations, keys for controlling the passage to said electromagnets of the actuating current, means operative at will for causing each said key by its depression to close the circuits to any of a plurality of electromagnets, means operated by said keys for undamping most of said sonorous bodies, and means under the control of the operator for varying the timbre elicited from one set of sonorous bodies relative to the timbre of the tones elicited from other said sets of sonorous bodies as well as varying the loudness of the tones elicited from one set of sonorous bodies relative to the loudness of the tones elicited from other said sets of sonorous bodies.

36. A musical instrument having a plurality of sets of magnetically attractive sonorous bodies and electromagnets for vibrating the same, means for delivering to said electromagnets properly timed pulsations, keys for controlling the passage to said electromagnets of the actuating current, means operative at will for causing each said key by its depression to close the circuits to any of a plurality of electromagnets, means operated by said keys for undamping most of said sonorous bodies, and means under the control of the operator for varying the pitch of the tones elicited from one set of sonorous bodies relative to the pitch of the tones elicited from other said sets of sonorous bodies.

37. A musical instrument having a plurality of sets of magnetically attractive sonorous bodies and electromagnets for vibrating the same, means for delivering to said electromagnets properly timed electric pulsations, keys for controlling the passage to said electromagnets of the actuating current, means operative at will for causing each said key by its depression to close the circuits to any of a plurality of electromagnets, means operated by said keys for undamping most of said sonorous bodies, and means under the control of the operator for varying the loudness of the tones elicited from one set of sonorous bodies relative to the loudness of the tones elicited from other sets of sonorous bodies.

38. A musical instrument having a plurality of sets of magnetically attractive sonorous bodies and electromagnets for vibrating the same, means for delivering to said electromagnets properly timed electric pulsations, keys for controlling the passage to said electromagnets of the actuating current, means operative at will for causing each said key by its depression to close the circuits to any of a plurality of electromagnets, means operated by said keys for undamping most of said sonorous bodies, and means under the control of the operator for varying the timbre elicited from one set of sonorous bodies relative to the timbre of the tones elicited from other said sets of sonorous bodies.

39. A musical instrument comprising a plurality of sets of sonorous bodies; corresponding sets of electromagnets for vibrating the bodies of the different sets; a source of electric current; means for producing timed pulsations of said current; electric conductors extending to the several magnets of the respective sets, and serving to deliver current thereto from the current source; insulated electric contacts arranged in groups, each group comprising as many vertical series as there are sets of sonorous bodies and electromagnets, said groups being arranged side by side in a horizontal row; keys for completing the magnet-circuits, each key carrying as many brushes as there are sets of sonorous bodies and magnets, each brush making contact successively with the contact blocks of its own vertical series as the key is depressed to varying depths; and return conductors connecting the magnets with the source of current.

40. A musical instrument comprising a plurality of sets of sonorous bodies; corresponding sets of electromagnets for vibrating the bodies of the different sets; a source of electric current; means for producing timed pulsations in said current; electric conductors extending to the several magnets of the respective sets and serving to deliver current thereto from said current-source; insulated electric contacts arranged in groups, each group comprising as many vertical series as there are sets of sonorous bodies and electromagnets; resistances between and connecting the contact blocks of each vertical series; keys for completing the magnet circuits, each key carrying as many brushes as there are sets of sonorous bodies and magnets, and each brush making contact successively with the contact blocks of its own vertical series as the key is depressed to varying depths; rheostats one for each set of electromagnets, each in a separate branch circuit between the source of current and the magnets of the set to which such rheostat belongs; and means for independently actuating the respective rheostats.

41. A musical instrument having a plurality of sets of magnetically attractive sonorous bodies and electromagnets for vibrating the same, means for delivering to said electromagnets properly timed electric pulsations, keys for controlling the passage to said electromagnets of the actuating current, means operative at will for causing each said key by its depression to close the circuits to any of a plurality of electromagnets, and means operated by said keys for undamping most of said sonorous bodies.

42. A musical instrument comprising a plurality of sets of sonorous bodies; corresponding sets of electromagnets for vibrating said bodies; a source of electric current; branch circuits including said source and said electromagnets, means in circuit with the source of current and the electromagnets for producing electric pulsations of said current; insulated contact blocks one for and connected with each magnet of the respective sets; and a key carrying as many insulated contact brushes as there are sets of sonorous bodies and magnets, said brushes respectively making contact simultaneously with a contact block of each set of magnets, and thus serving to close the circuit of a magnet and to cause vibration of a sonorous body of each set.

43. A musical instrument comprising a plurality of sets of sonorous bodies; corresponding sets of electromagnets for vibrating said bodies; a source of electric current; branch circuits including said source and said electromagnets, means in circuit with the source of current and the electromagnets for producing electric pulsations of said current; insulated contact blocks one for and connected with each magnet of the respective sets; a key carrying as many insulated contact brushes as there are sets of sonorous bodies and magnets, said brushes respectively making contact simultaneously with a contact block of each set of magnets, and thus serving to close the circuits of a magnet and to cause vibration of a sonorous body of each set; and means independent of said key for opening and closing at will the supply circuit of any of said sets of magnets.

44. A musical instrument having a plurality of sets of tuned electromagnetically actuated sonorous bodies, a plurality of sets of electromagnets for actuating these sonorous bodies, means for delivering at will correctly timed electrical impulses to these electromagnets, and a rheostat for each set of electromagnets having a single operating member whereby the attractive strength of said electromagnets is controlled at will.

45. A musical instrument comprising two sets of sonorous bodies actuated by two corresponding sets of electromagnets to which correctly timed electrical impulses are delivered, a source of electrical energy, means for delivering these timed impulses to the said electromagnets, a single lever and two rheostats variable independently of each other at the will of the player by movements of said lever, the one rheostat controlling the degree of magnetic excitation of one set of electromagnets and the other the degree of excitation of the other said set.

46. A musical instrument having a plurality of sets of sonorous bodies, corresponding sets of electromagnets for vibrating said bodies, and means under the control of the player for varying at will the strength of the magnets of said sets simultaneously or independently at will.

47. A musical instrument having two sets of sonorous bodies, electromagnets for actuating said sonorous bodies, means for delivering properly timed electrical impulses to said magnets, means for percussively actuating one set of said sonorous bodies, means for damping certain of the sonorous bodies of each set, mechanical and electrical means for actuating said dampers, a stop or pedal under the control of the operator for raising and lowering all of said dampers, and a stop or pedal for controlling the loudness of the electromagnetically produced tones of the other set.

48. A musical instrument comprising a plurality of sets of sonorous bodies; corresponding sets of electromagnets for vibrating said bodies; a source of electric current; conductors connecting said source of current with the magnets of the respective sets; rheostats one in circuit with each set of magnets; and a pedal connected with a movable member of each of the rheostats and having motion in a plurality of planes, the motion in each different plane serving to operate a different one of said rheostats, and thereby to vary the resistance in circuit with the magnets of a different set.

49. A musical instrument comprising two sets of sonorous bodies; corresponding sets of electromagnets for vibrating said bodies; a source of electric current; conductors connecting the magnets of the respective sets with the source of current; two rheostats respectively in circuit with the different sets of magnets; and a pedal connected with a movable member of each of said rheostats and having motion in two planes, the motion in one plane acting upon one rheostat to vary the resistance in the circuit of one set of magnets, and the motion in the other plane acting upon the other rheostat to vary the resistance in circuit with the magnets of the other set.

50. A musical instrument having two sets of electromagnetically actuated sonorous bodies and means for their actuation, means under the control of a single limb of the operator for varying the loudness of the tones elicited from each said set of sonorous bodies relative to each other and independently of each other.

51. A musical instrument comprising two sets of sonorous bodies; corresponding sets of electromagnets for vibrating said bodies; a source of electric current; means for delivering to said magnets timed electrical pulsations; keys for controlling the passage of said pulsations to said magnets; rheostats one included in the circuit of each set of magnets; and a pedal connected with said rheostats and adapted through its movements to control said rheostats, and thereby to vary the amount of current delivered to the electromagnets of each set independently of the amount delivered to those of the other set.

52. A musical instrument comprising a plurality of sets of sonorous bodies; corresponding sets of electromagnets for vibrating said bodies; a source of electric current; and a rotative member in circuit with the magnets of the respective sets for delivering to the magnets of each set timed electric pulsations of like periodicity.

53. A musical instrument comprising two sets of sonorous bodies; corresponding sets of electromagnets for vibrating said bodies; dampers for sonorous bodies of each set, normally damping said bodies; mechanical means for vibrating the sonorous bodies of one set and for withdrawing the dampers thereof; electrical means under the control of the player for withdrawing the dampers of other sets of said sonorous bodies; a source of electric current; and conductors connecting the vibration-producing magnets and the electrical damper-withdrawing means with the source of current.

54. A musical instrument comprising a plurality of sets of sonorous bodies; corresponding sets of electromagnets for vibrating said bodies; dampers for sonorous bodies of each set, normally damping said bodies; mechanical means for vibrating the sonorous bodies of one set and for withdrawing the dampers thereof; electrical means under the control of the player for withdrawing the dampers of the several sets of sonorous bodies; a source of electric current; and conductors connecting the vibration-producing magnets and the electrical damper-withdrawing means with the source of current.

55. A musical instrument having a plurality of sets of electromagnetically actuated tuned sonorous bodies, a plurality of sets of electromagnets for actuating said sets of sonorous bodies, one set of magnets for each set of sonorous bodies electromagnetically actuated; correctly timed, rotative, current-pulsating mechanism including annular make and break members arranged in cylindrical form; a plurality of brushes contacting with each said annular member; a source of electrical power; and electrical circuits including said source of power, annular member, brushes, electromagnets and movable contacts for opening and closing said circuits.

56. A musical instrument having two sets of electromagnetically actuated tuned sonorous bodies, two sets of electromagnets for actuating said sonorous bodies, a source of electric current, a current pulsating device comprising annular members having alternate sections of high and low resistance material, there being as many such members as there are sonorous bodies tuned to different frequencies and each said member being provided with two brushes, means for revolving said members at correctly timed, predetermined speeds and for delivering at will any of said pulsations to the electromagnets associated with them, and branch circuits including said source of current, said electromagnets, and said brushes.

57. A musical instrument comprising a plurality of sets of tuned sonorous bodies; corresponding sets of electromagnets for vibrating said bodies; a source of electric current; a current-pulsating device comprising a plurality of rotative members, each spaced to produce a different and predetermined frequency of pulsation; a plurality of brushes for each of said rotative members; and conductors connecting the electromagnets, pulsation members and brushes with the source of current, the respective brushes of each rotative member being included in circuit with corresponding electromagnets of different sets of sonorous bodies.

58. A musical instrument having a plurality of sets of electromagnetically actuated sonorous bodies, a keyboard and means, under the control of the operator, for simultaneously eliciting tones from a plurality of sonorous bodies in each set upon the pressure of a single key of the keyboard.

59. A musical instrument having a plurality of sets of electromagnetically operated sonorous bodies, a keyboard adapted to operate all of said sets of sonorous bodies, and means under the control of the player for preventing said keyboard from operating any one or more of said sets of sonorous bodies.

60. A musical instrument comprising a plurality of sets of sonorous bodies; corresponding sets of electromagnets for vibrating said bodies; dampers associated with said bodies and normally damping the same; a blanket damper normally damping certain of said bodies; electromagnetic means for holding said blanket damper normally in damping position; electromagnetic means for withdrawing individual dampers from damping position; keys for closing the circuits of the body-vibrating magnets; a circuit breaker included in circuit with the electromagnets of the blanket damper holding device, separable through depression of certain of said keys; mechanical devices operated through depression of said keys to withdraw the individual dampers of one set of sonorous bodies; pedal-actuated mechanism for withdrawing the dampers of another of said sets of sonorous bodies; a source of electric current; and conductors connecting said source of current with the several vibrating-producing and damper-actuating magnets.

61. A musical instrument comprising a plurality of sets of tuned sonorous bodies; corresponding sets of electromagnets for vibrating said bodies; a source of current; means for delivering to the magnets properly timed electric impulses; conductors connecting the electromagnets, pulsation-producing means and current source; and hammers for percussively vibrating the bodies of one of said sets.

62. A musical instrument having a plurality of sets of sonorous bodies, a plurality of sets of electromagnets for actuating these sonorous bodies, and means under the control of the operator for delivering correctly timed electrical impulses to any of the electromagnets of any or all of the said sets of electromagnets.

63. A musical instrument having a plurality of sets of sonorous bodies, a plurality of sets of electromagnets for actuating these sonorous bodies, and means under the control of the operator for delivering correctly timed electrical impulses of any requisite power to any or all of the electromagnets of any of the said sets of electromagnets.

64. A musical instrument having a plurality of sets of sonorous bodies, a plurality of sets of electromagnets for actuating these sonorous bodies, and means under the control of the operator for delivering at will to any of the electromagnets comprising the greater portion of any of the said sets, correctly timed electrical pulsations of any one of a variety of different frequencies.

65. A musical instrument having two sets of sonorous bodies electromagnetically actuated and means under the control of the player for varying at will the loudness, the timbre and the pitch of the tones elicited from each set of sonorous bodies independently of the loudness, the pitch and the timbre elicited from the other set of sonorous bodies.

66. A musical instrument having two sets of sonorous bodies electromagnetically actuated and one of said sets mechanically percussively actuated, a keyboard operatively related to both sets of bodies, and means whereby the depression of a single key simultaneously produces three distinct different tones.

67. A musical instrument having two sets of tuned sonorous bodies electromagnetically actuated, and two keyboards one of them adapted to operate one set of sonorous bodies and the other adapted to operate at will either one or both of said sets of sonorous bodies.

68. A musical instrument having a plurality of sets of tuned electromagnetically actuated sonorous bodies, and a keyboard adapted at will to operate any predetermined number of the said sets of sonorous bodies.

69. A musical instrument having a plurality of sets of sonorous bodies electromagnetically actuated, and means under the control of the player for varying the loudness of the tones emitted from one set of sonorous bodies irrespective of the loudness of the tones emitted from the other sets of sonorous bodies, and for controlling at all times the loudness of the music emitted by the instrument sensibly independent of the number of sonorous bodies simultaneously sounding.

70. A musical instrument having a plurality of sets of sonorous bodies electromagnetically actuated, and means under the control of the player for regulating the loudness of the music emitted by the entire instrument sensibly independent of the number of sonorous bodies simultaneously sounding.

71. A musical instrument having a plurality of sets of tuned sonorous bodies; electromagnets for operating said sonorous bodies; a keyboard having as many keys as there are notes included in the compass of said instrument, each key normally controlling a particular associated sonorous body; means for delivering correctly timed electrical pulsations to said electromagnets, the pulsations normal to each electromagnet being of the same frequency as that of its associated tuned sonorous body; a timbre-control switch for switching to the said electromagnets timed electrical impulses other than those of the periodicity normal to their associated sonorous bodies; and a transposer-switch for causing the keys of the keyboard to actuate sonorous bodies other than those normally associated with them.

72. A musical instrument having two sets of tuned strings electromagnetically actuated, and two sounding-boards over which said sets of strings are strung placed back to back, the treble end of one set of strings being opposite to the bass end of the other set.

73. A musical instrument comprising a plurality of sets of magnetically attractive sonorous bodies each said set consisting of a multiplicity of sonorous bodies tuned in musical relations to each other, electromagnets for vibrating these bodies, means for delivering to said electromagnets properly timed electric pulsations, keys for cotrolling the passage to the electromagnets of the currents energizing them, electric damping mechanism for one set of sonorous bodies, damping mechanism for the other sets of sonorous bodies, and means operative at will for causing the action of the keys to energize electromagnets (and their corresponding sonorous bodies and associated dampers) other than those normally operated by them.

74. A musical instrument comprising a plurality of sets of tuned sonorous bodies each set embracing a plurality of octaves, some of said sets being electromagnetically attractive, means including electromagnets for delivering thereto timed attractive impulses, hammers for percussively actuating one set of said bodies, and a keyboard and action for said hammers, said keyboard also controlling the said means for delivering timed impulses.

In testimony that we claim the foregoing invention, we have hereunto set our hands this 17th day of December, 1912.

MELVIN L. SEVERY.
GEORGE B. SINCLAIR.

Witnesses:
EDWARD S. CROCKETT,
A. B. UPHAM.